US012623107B2

(12) United States Patent
Rucker et al.

(10) Patent No.: US 12,623,107 B2
(45) Date of Patent: May 12, 2026

(54) TOOL FOR INSTALLING FIRE SPRINKLERS

(71) Applicant: Tyco Fire Products LP, Cranston, RI (US)

(72) Inventors: William K. Rucker, Providence, RI (US); Steven L. Shields, Lubbock, TX (US); Daniel Cross, South Kingston, RI (US); Jianhu Nie, Lansdale, PA (US)

(73) Assignee: Tyco Fire Products LP, Cranston, RI (US)

( * ) Notice: Subject to any disclaimer, the term of this patent is extended or adjusted under 35 U.S.C. 154(b) by 389 days.

(21) Appl. No.: 18/262,943

(22) PCT Filed: Mar. 23, 2022

(86) PCT No.: PCT/IB2022/052679

§ 371 (c)(1),
(2) Date: Jul. 26, 2023

(87) PCT Pub. No.: WO2022/229732

PCT Pub. Date: Nov. 3, 2022

(65) Prior Publication Data

US 2024/0075593 A1 Mar. 7, 2024

Related U.S. Application Data

(60) Provisional application No. 63/180,377, filed on Apr. 27, 2021.

(51) Int. Cl.

*A62C 37/14* (2006.01)
*A62C 31/28* (2006.01)

(Continued)

(52) U.S. Cl.

CPC .............. *A62C 37/14* (2013.01); *A62C 31/28* (2013.01); *A62C 99/009* (2013.01); *B25B 13/48* (2013.01); *B25B 13/065* (2013.01)

(58) Field of Classification Search

CPC ... B25B 23/14; B25B 23/141; B25B 23/1415; B25B 23/142; B25B 13/06;

(Continued)

(56) References Cited

U.S. PATENT DOCUMENTS 1,164,073 A * 12/1915 Cunningham .......... B25B 13/08 81/472
4,649,727 A * 3/1987 Gray ...................... B21J 15/022 81/10

(Continued)

FOREIGN PATENT DOCUMENTS

| | | |
|---|---|---|
| JP | H10-277961 A | 10/1998 |
| JP | 2008-126326 A | 6/2008 |
| JP | 2018-008353 A | 1/2018 |

OTHER PUBLICATIONS

Korean Intellectual Property Office as International Searching Authority; International Search Report and Written Opinion; International Patent Application No. PCT/IB2022/052679; Jun. 23, 2022; 10 pages.

*Primary Examiner* — David B. Thomas
(74) *Attorney, Agent, or Firm* — Foley & Lardner LLP

(57) ABSTRACT

At least one aspect is directed to a device to configure a fire sprinkler. The device can have an elongated member. The elongated member can have an open end, an opposing closed end, and a body extending laterally therebetween. The open end can receive a portion of a fire sprinkler. The closed end can have a main aperture. The main aperture can receive a portion of a ratcheting socket wrench drive. The closed end can have at least one surrounding aperture. The surrounding aperture can be positioned apart from the main aperture to define a solid partition therebetween. The solid partition can have non-uniform thickness between the main aperture and the at least one surrounding aperture.

20 Claims, 10 Drawing Sheets

(51) Int. Cl.
*A62C 99/00* (2010.01)
*B25B 13/06* (2006.01)
*B25B 13/48* (2006.01)

(58) Field of Classification Search
CPC ....... B25B 13/065; B25B 13/08; B25B 13/48; A62C 37/14; A62C 37/20; A62C 99/009; A62C 31/28
See application file for complete search history.

(56) References Cited

U.S. PATENT DOCUMENTS 4,784,549 A * 11/1988 Wing ...................... B25B 23/14 411/335
4,800,786 A * 1/1989 Arnold .................. B29C 66/723 81/177.1
4,858,299 A * 8/1989 Wing ...................... F16B 31/02 29/446
5,158,458 A 10/1992 Perry
5,367,925 A 11/1994 Gasparre
5,368,480 A * 11/1994 Balfour ................ A61C 8/0089 433/141
6,282,994 B1 * 9/2001 Wei ..................... B25B 23/0014 81/121.1
6,308,598 B1 * 10/2001 O'Neil ................ B25B 23/1415 81/439
6,669,111 B2 * 12/2003 Vinson ................... A62C 31/28 206/349
6,869,366 B2 * 3/2005 Delaney .............. B25B 23/0014 81/177.75
7,299,725 B2 * 11/2007 Helstern ............... F16B 31/021 81/468
7,347,129 B1 * 3/2008 Youtsey .................. B25B 13/06 81/472
8,276,487 B2 * 10/2012 Wengreen ........... B25B 23/1427 81/477
9,308,475 B2 * 4/2016 Badeau .................. B01D 35/30
9,630,039 B2 * 4/2017 Koiwa .................... B25B 13/02
9,925,650 B2 * 3/2018 Markiewicz ........ B25B 27/0042
10,786,767 B2 * 9/2020 Badeau ................... F16D 7/044
2003/0110902 A1 * 6/2003 Grossman ........... B25B 23/1422 81/124.3
2004/0226419 A1 11/2004 Morgan
2006/0123958 A1 * 6/2006 Jamnia .................. B25B 23/141 81/467
2006/0201286 A1 9/2006 Ide
2009/0234365 A1 * 9/2009 Gross ................. A61B 17/8875 606/104
2009/0320652 A1 * 12/2009 Allred ................... B25B 13/065 81/176.2
2013/0020406 A1 * 1/2013 Koiwa .................... B25B 13/02 81/52

* cited by examiner

TOOL FOR INSTALLING FIRE SPRINKLERS

CROSS-REFERENCE TO RELATED APPLICATIONS

The present application claims the benefit of and priority to U.S. Provisional Application No. 63/180,377, filed Apr. 27, 2021, the disclosure of which is incorporated herein by reference in its entirety.

BACKGROUND

Buildings and other areas can include sprinklers to provide fire exposure protection. In the event of a fire, the sprinklers can dispense a fluid to suppress or extinguish the fire or to protect building elements from exposure to heat radiating from the fire.

SUMMARY

At least one aspect is directed to a device to configure a fire sprinkler. The device can have an elongated member. The elongated member can have an open end, an opposing closed end, and a body extending longitudinally therebetween. The open end can receive a portion of a sprinkler. The closed end can have a main aperture. The main aperture can receive a portion of a ratcheting socket wrench drive. The closed end can have at least one surrounding aperture. The surrounding aperture can be positioned apart from the main aperture to define a solid partition therebetween. The solid partition can have non-uniform thickness between the main aperture and the at least one surrounding aperture.

At least one aspect is directed to a device to configure a fire sprinkler. The device can have an elongated member. The elongated member can have an open end, an opposing closed end, and a body extending longitudinally therebetween. The open end can receive a portion of a sprinkler. The closed end can have a main aperture. The main aperture can receive a portion of a ratcheting socket wrench drive. The closed end can have at least two additional apertures to define a spoke. The spoke can extend from a portion of the closed end surrounding the main aperture to a portion of the closed end away from the main aperture. The spoke can have non-uniform geometry.

At least one aspect is directed to a device to configure a fire sprinkler. The device can have an elongated member. The member can have an open end, an opposing closed end, and a body extending longitudinally therebetween. The open end can receive a portion of a sprinkler. The closed end can have a main aperture. The main aperture can receive a portion of a ratcheting socket wrench drive. The closed end can have at least one additional aperture. The additional aperture can have at least one portion connected to the main aperture to define a channel therebetween. At least one portion of the closed end can protrude into the channel to define a projection.

At least one aspect is directed to a method of configuring a fire sprinkler. The method can include providing an elongated member. The elongated member can have an open end, an opposing closed end, and a body extending longitudinally therebetween. The method can include receiving, via the open end of the elongated member, a portion of a sprinkler. The method can include receiving, via a main aperture of the closed end of the elongated member, a portion of a ratcheting socket wrench drive. At least one surrounding aperture can be positioned apart from the main aperture so as to define a solid partition therebetween. The solid partition can have a non-uniform thickness between the main aperture and at least one surrounding aperture.

At least one aspect is directed to a method of configuring a fire sprinkler. The method can include providing an elongated member. The elongated member can have an open end, an opposing closed end, and a body extending longitudinally therebetween. The open end can receive a portion of a sprinkler. The closed end can have a main aperture. The main aperture can receive a portion of a ratcheting socket wrench drive. The closed end can have at least one surrounding aperture. The surrounding aperture can be positioned apart from the main aperture to define a solid partition therebetween. The solid partition can have non-uniform thickness between the main aperture and the at least one surrounding aperture.

DETAILED DESCRIPTION

Before turning to the figures, which illustrate certain examples, it is noted that the present disclosure is not limited to the details or methodology set forth in the description or illustrated in the figures. The terminology used herein is for the purpose of description only and should not be regarded as limiting.

The present disclosure generally refers to a device to configure a fire sprinkler. For example, the present disclosure refers to a device to remove a fire sprinkler from a piping system, fitting, or other system. The present disclosure refers to a device to install a fire sprinkler into a piping system, fitting or other system, as another example.

At least one aspect of the present disclosure is a device to configure a fire sprinkler. The device can include an elongated member with an open end, a closed end and a body connecting the open and closed end. The open end can receive a portion of a sprinkler. The closed end can have several openings. At least one of the openings can receive a portion of a ratcheting socket wrench drive. At least one of the openings can be spaced apart from another opening to define a continuous partition between the openings. The partition can have a non-uniform thickness.

During installation of the fire sprinkler into a piping system or fitting, the device can prevent over-torqueing. The device can break at the partition when torqued above a threshold level to prevent damage to the fire sprinkler. The device can also be used to remove the fire sprinkler from the piping system. The device can remain intact at the partition when torqued to remove the fire sprinkler. Thus, the device can yield to prevent over torqueing during installation when high torque is applied in a clockwise direction, but not yield during removal when torque is applied in a counterclockwise direction.

Referring generally to the figures, devices can be utilized to assist in configuring a fire sprinkler into a piping system. Devices are generally utilized to prevent damaging the fire sprinkler when installation torque is applied. Devices are also generally utilized to remove the fire sprinklers from piping system for inspection, among other reasons. Fire sprinklers can generally inhibit or permit flow of fluid (typically water, but also in some applications fire suppressant fluid) depending upon conditions. In the instance of a fire or detected conditions that may be indicative of a fire (e.g., increased heat, smoke, or another indication), the sprinklers can permit the flow of fluid such that the fluid may contact a deflector and be dispersed so as to provide protection to an area.

Figure 1:
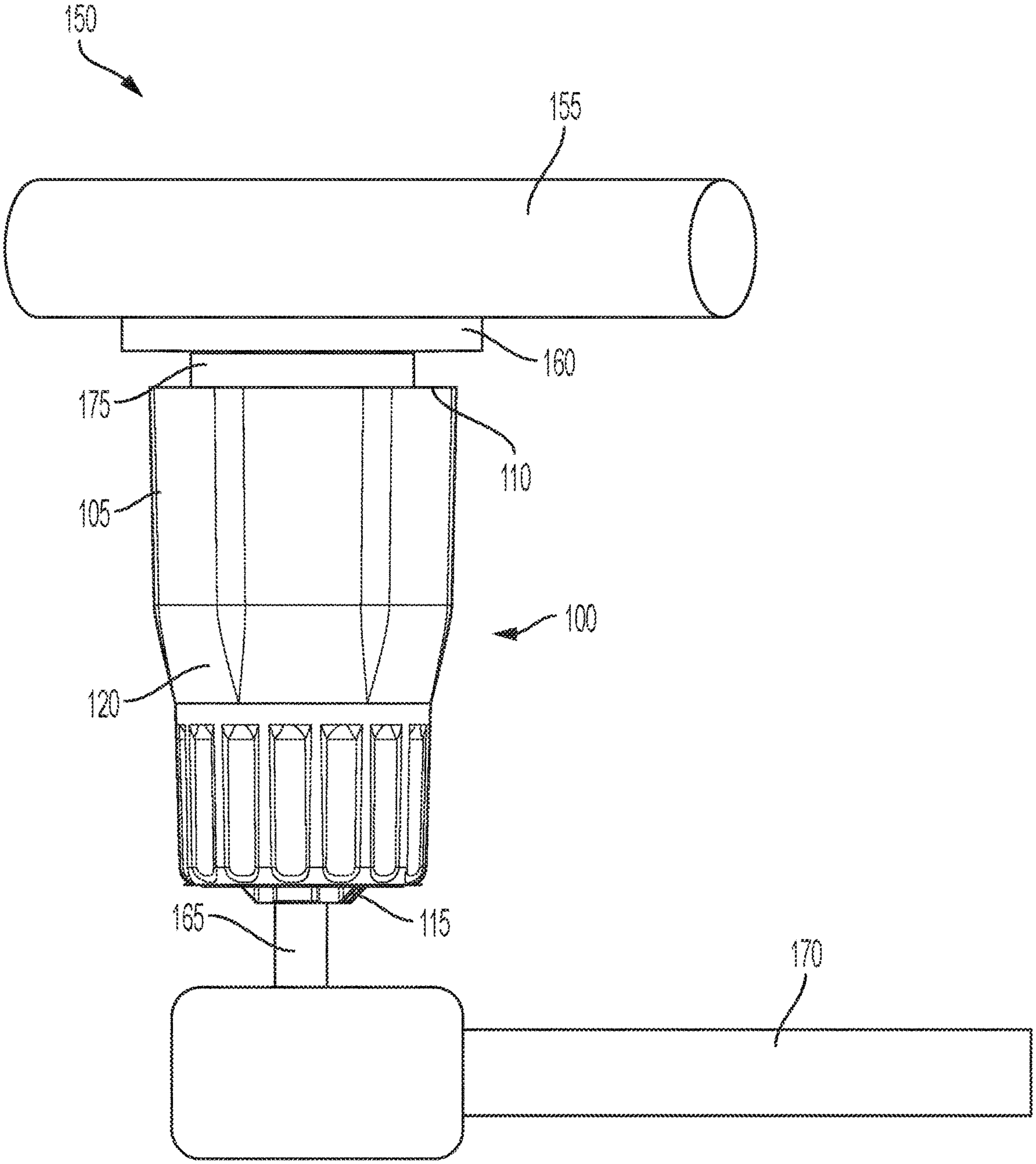
FIG. 1 is an example side view of a device configuring a fire sprinkler into a portion of a piping system, according to an example implementation.

FIG. 1 depicts a system 150. The system 150 can include at least one fire sprinkler 175. The system 150 can include at least one fluid supply component 155. For example, the fluid supply component 155 can be a pipe, line, hose, or another component to provide fluid to the system 150. The system 150 can include at least one fitting 160 for fire sprinkler 175 attachment. The fitting 160 can be any clamp, conduit, connector, or another component. The fitting 160 can be any component that couples the fire sprinkler 175 with the fluid supply component 155. For example, the fitting 160 can be threaded to couple the fire sprinkler 175 with the fluid supply component 155.

A device 100 can assist in configuring the fire sprinkler 175 with the system 150. For example, the device 100 can assist with installing the fire sprinkler 175 into the system 150. The device 100 can assist with installing the fire sprinkler 175 into the fitting 160, as an example. In another example, the device 100 can assist with removing the fire sprinkler 175 from the system 150. For example, the device 100 can assist with removing the fire sprinkler 175 from the fitting 160. The device 100 can be made of various materials. For example, the device 100 can be made of a non-metallic material. The device 100 can be made of a metallic material, as another example. The device 100 can be made of a combination of metallic and non-metallic materials.

The device 100 can be an elongated member 105. For example, the elongated member 105 can include an open end 110 and a closed end 115. The closed end 115 can include several openings. For example, the closed end 115 can include one opening. The closed end 115 can include five openings. The closed end 115 can include ten openings. The closed end 115 can include greater than ten openings. The elongated member 105 can include a body 120 extending between the open end 110 and the closed end 115. For example, the body 120 can be tubular in shape. The body 120 can be rectangular in shape. The body 120 can extend between an open end 110 and a closed end 115 in various shapes.

Referring to FIGS. 1-8, the elongated member 105 can be coupled with a drive 165 of a ratcheting socket wrench 170. For example, the elongated member 105 can include a main aperture 205 for receiving the drive 165. The main aperture 205 can be square in shape. The main aperture 205 can be triangular in shape. The main aperture 205 can be rectangular in shape. The main aperture 205 can be any shape to receive the drive 165. The elongated member 105 can be coupled with at least one portion of the fire sprinkler 175. For example, the open end 110 of the elongated member 105 can receive the portion of the fire sprinkler 175. The open end 110 can be hexagonal in shape. The open end 110 can be rectangular in shape. The open end 110 can be round in shape. The open end 110 can be any shape to receive a portion of the fire sprinkler 175.

The closed end 115 of the elongated member 105 can include at least one surrounding aperture 210. For example, the closed end 115 can include two surrounding apertures 210. The closed end 115 can include four surrounding apertures 210. The closed end 115 can include more than four surrounding apertures 210. The surrounding aperture 210 can be spaced apart from the main aperture 205. For example, the surrounding aperture 210 can be spaced apart from the main aperture 205 so as to define a solid partition 215 therebetween. For example, the solid partition 215 can be a continuous barrier between the main aperture 205 and the surrounding aperture 210, meaning the partition 215 can extend between the main aperture 205 and the surrounding aperture 210 continuously such that it has no breaks or openings.

Figure 4:
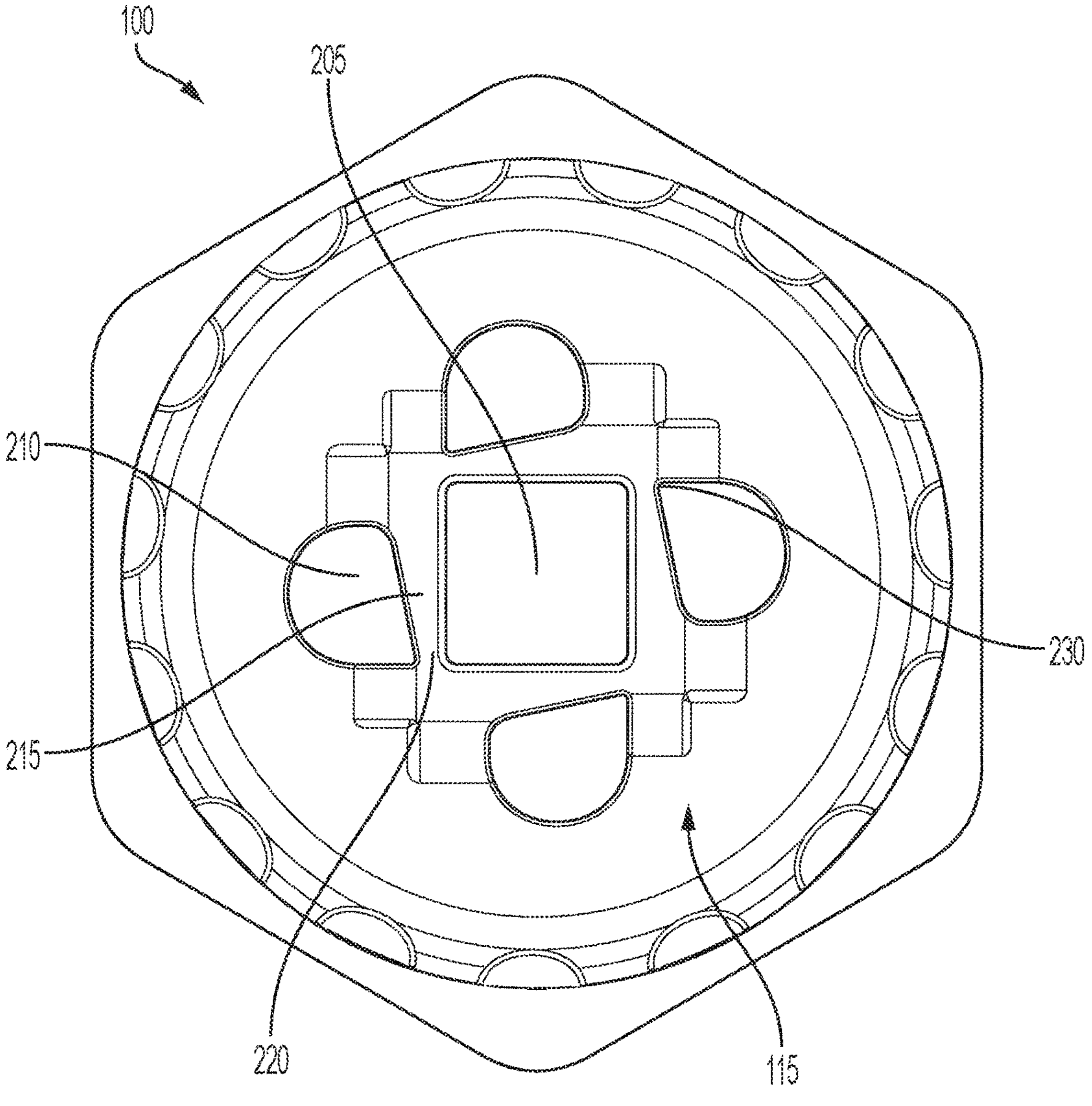
FIG. 4 is an example top view of a closed end of the device of FIG. 1, according to an example implementation.
Figure 5:
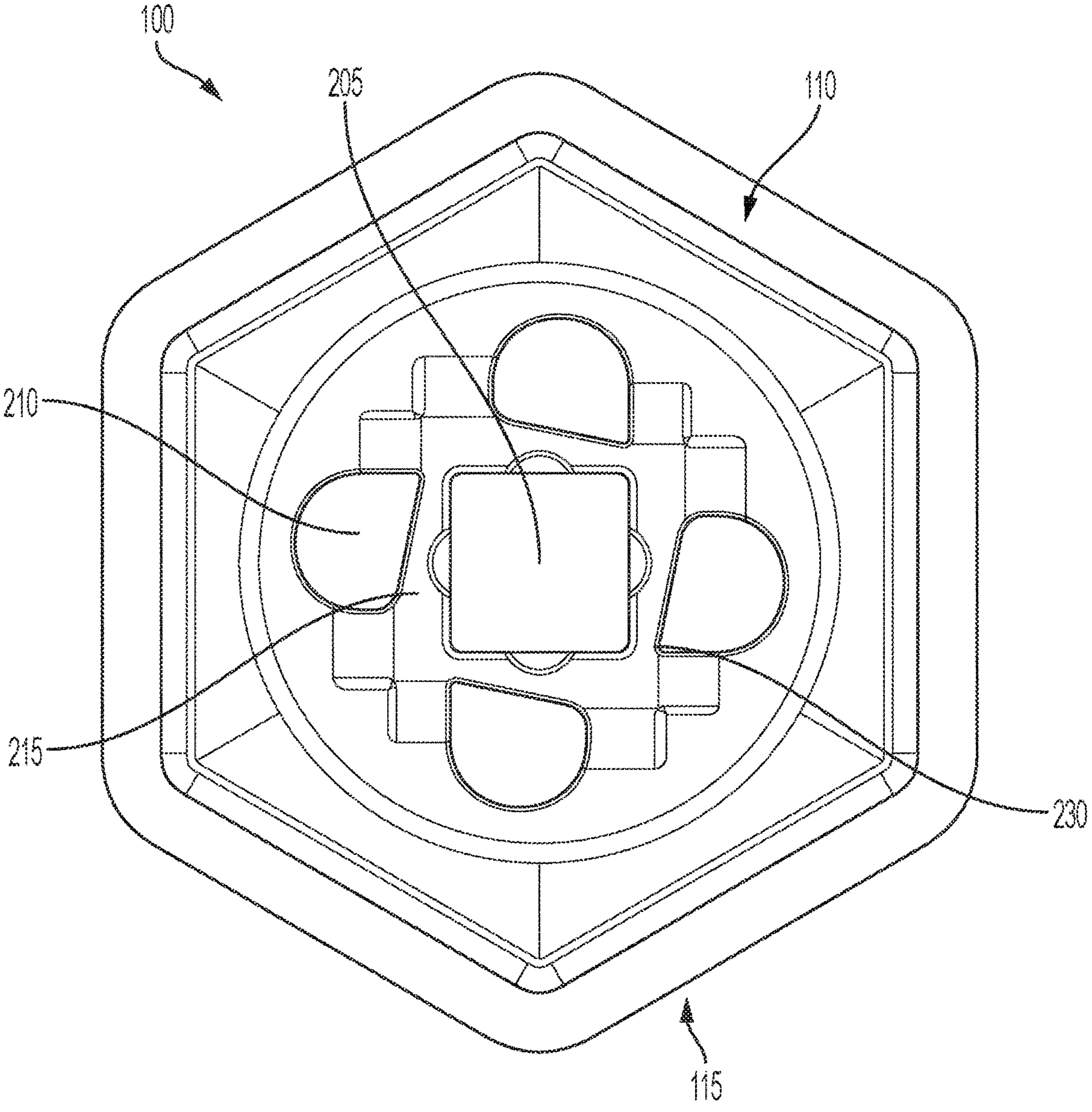
FIG. 5 is an example bottom view of an open end of the device of FIG. 1, according to an example implementation.

Referring to FIGS. 4-5, among others, the solid partition 215 can have a non-uniform thickness. For example, the solid partition 215 can have a thicker portion and a thinner portion. The solid partition 215 can decrease in thickness from one portion of the solid partition 215 to another portion of the solid partition 215. The solid partition 215 can increase in thickness from one portion of the solid partition 215 to another portion of the solid partition 215.

The elongated member 105 can fracture responsive to torque applied above a threshold level. For example, the solid partition 215 can fracture responsive to torque above a threshold level applied in an installation direction. For instance, the solid partition 215 can fracture to prevent over-torqueing during installation of the fire sprinkler 175 to prevent damage to the fire sprinkler 175. The elongated member 105 can yield when torque is applied above a threshold level during installation before the fire sprinkler 175 can be damaged, as an example. The threshold level can be defined as the level at which damage would occur to the fire sprinkler 175 if the elongated member 105 were not being used. For example, damage can include stripping any threads of the fire sprinkler 175. Damage can include breaking a portion of the fire sprinkler 175 during installation. Damage can include any means of causing the fire sprinkler 175 not to be correctly installed into the system 150.

The elongated member 105 can fracture at a thinnest point 220 of the solid partition 215. For example, the solid partition 215 can be thinner at a portion of the solid partition 215 that receives a maximum amount of force from the drive 165 during installation of the fire sprinkler 175 than a portion of the solid partition 215 that does not receive the maximum amount of force from the drive 165 during installation of the fire sprinkler 175. The elongated member 105 can fracture at a thinnest point 220 of any of the one or more solid partitions 215. For example, the elongated member 105 can include a plurality of solid partitions 215 of non-uniform thickness. The elongated member 105 can include a plurality of thinnest points 220 of the same thickness. The elongated member 105 can fracture at any of the plurality of thinnest points 220 of the plurality of solid partitions 215.

The elongated member 105 can maintain structural integrity responsive to torque applied in a removal direction. For example, the solid partition 215 can remain intact responsive to torque applied while removing the fire sprinkler 175 from the system 150. For example, the solid partition 215 can be thicker at a portion of the solid partition 215 that receives a maximum amount of force from the drive 165 during removal than a portion of the solid partition 215 that does not receive the maximum amount of force from the drive 165 during removal of the fire sprinkler 175.

The main aperture 205 can be square in shape. For example, the main aperture 205 can be square to receive the drive 165 of the ratcheting socket wrench 170. For example, the main aperture 205 can receive the drive 165 of the ratcheting socket wrench 170 such that the drive 165 engages with at least one of the solid partitions 215 surrounding the main aperture 205. For instance, the main aperture 205 can receive the drive 165 of the ratcheting socket wrench 170 such that the drive 165 engages with at least one of the solid partitions 215 surrounding the main aperture 205 during installation of the fire sprinkler 175. In another instance, the main aperture 205 can receive the drive 165 of the ratcheting socket wrench 170 such that the drive 165 engages with at least one of the solid partitions 215 surrounding the main aperture 205 during removal of the fire sprinkler 175.

Figure 2:
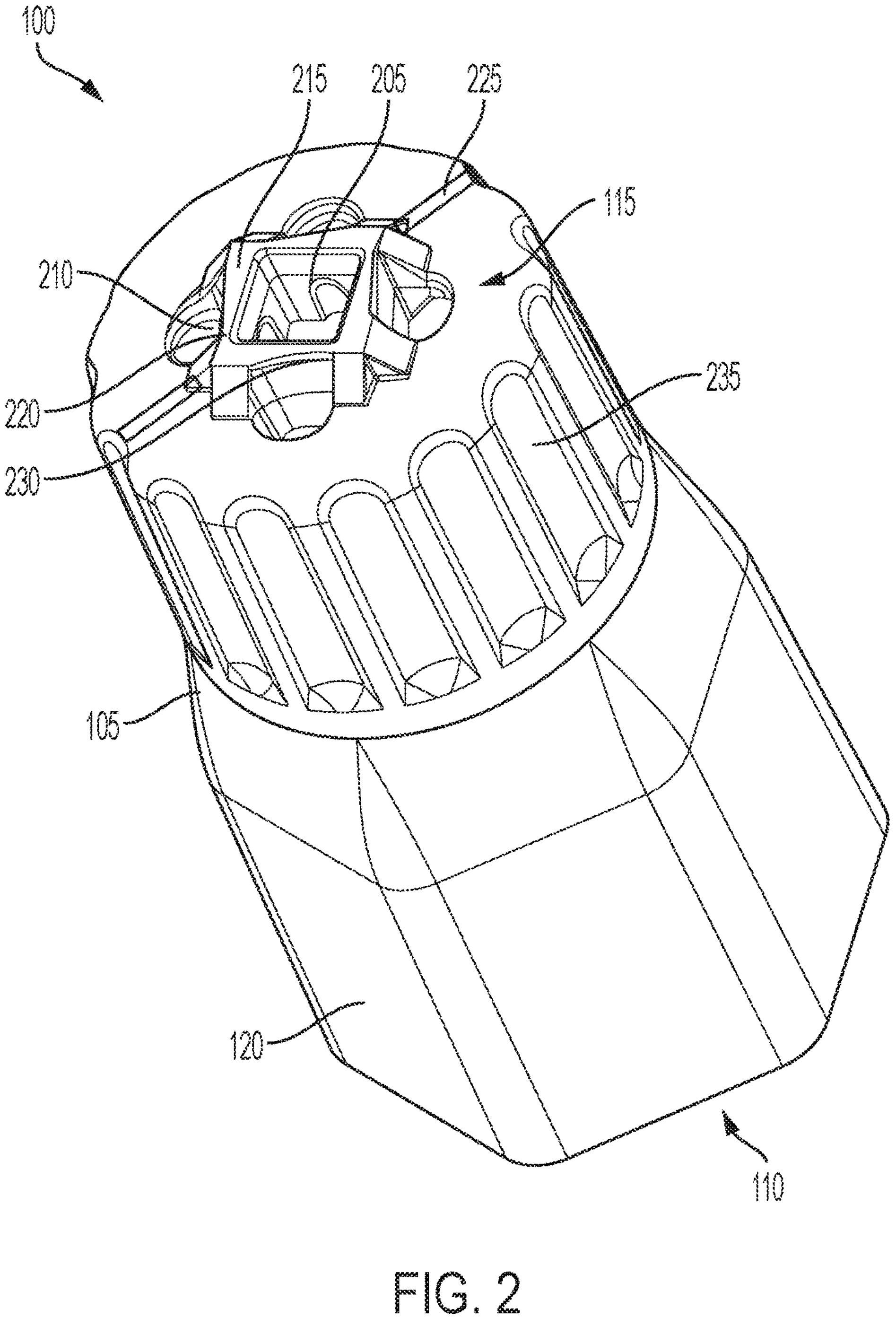
FIG. 2 is an example top perspective view of the device of FIG. 1, according to an example implementation.

The elongated member 105 can include at least one fillet edge 230. For example, the fillet edge 230 can be defined between a portion of the solid partition 215 and a portion of the surrounding aperture 210, as depicted in FIGS. 2, 4, and 5, and among others. The fillet edge 230 can have a radius (e.g., rounded edge portion) greater than 0 inches. For example, the fillet edge 230 can have a radius of 0.01 inches. The fillet edge 230 can have a radius of 0.02 inches. The fillet edge 230 can have a radius of 0.04 inches. The fillet edge 230 can have a radius greater than 0.04 inches.

The elongated member 105 can include at least one flute 235 extending longitudinally along an exterior portion of the elongated member 105. For example, the elongated member 105 can include a plurality of flutes 235 that extend from the closed end 115 and longitudinally along an upper exterior portion of the elongated member 105, as depicted in FIG. 2. The elongated member 105 can include one or more flutes 235 that extend from the open end 110 and longitudinally along a lower portion of the elongated member 105, as another example. The elongated member 105 can include at least one flute 235 that extends longitudinally along the elongated member 105 in between the open end 110 and the closed end 115, as yet another example. The flutes 235 can vary in size or shape along the elongated member 105. The elongated member 105 can include any number of flutes 235. For example, the elongated member 105 can include 0 flutes 235. The elongated member 105 can include more than 0 flutes 235. For example, the elongated member 105 can include one flute 235. The elongated member 105 can include 20 flutes, as another example.

Figure 6:
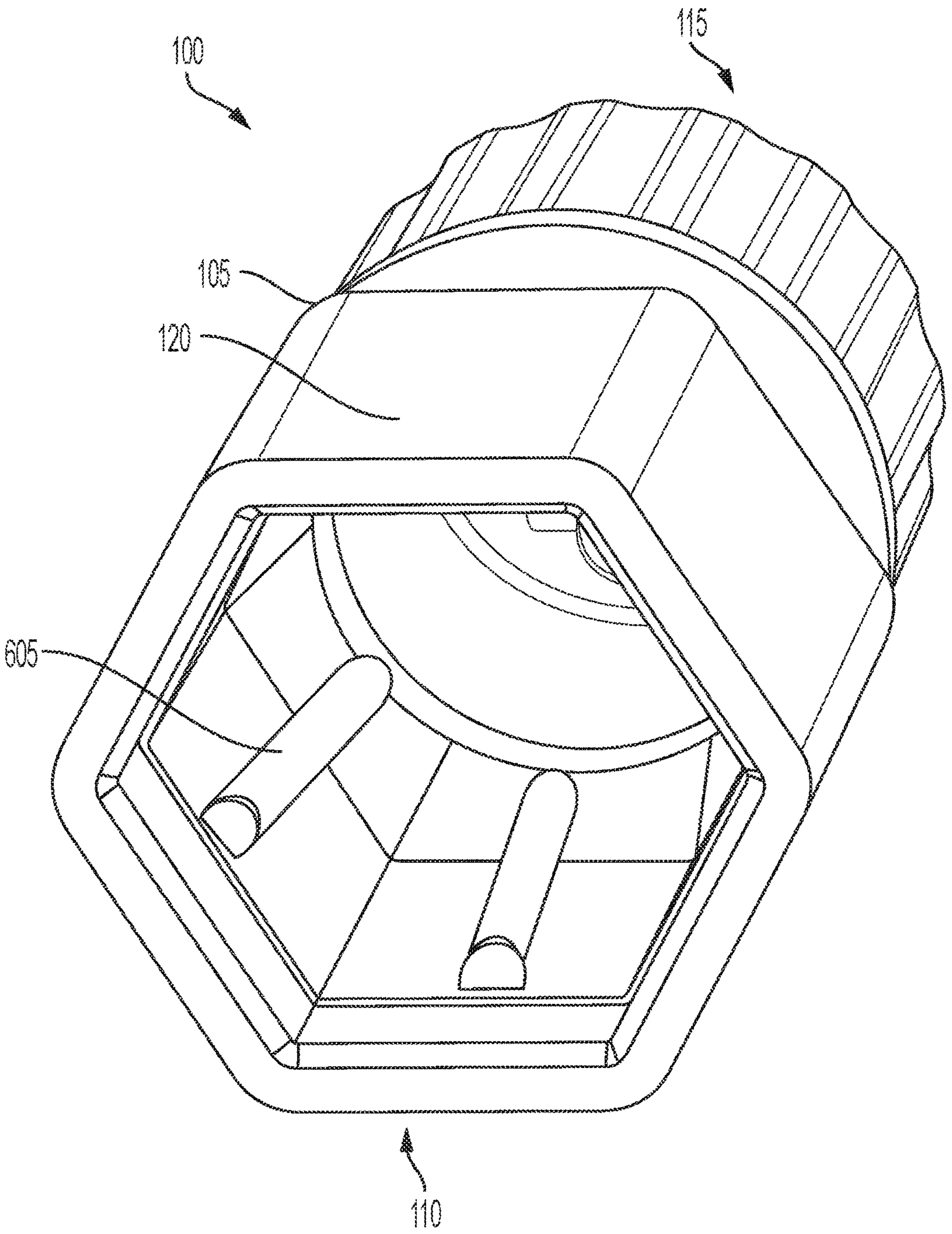
FIG. 6 is an example bottom perspective view of the device of FIG. 1, according to an example implementation.

The elongated member 105 can include at least one drive pin 605 extending longitudinally along an interior portion of the elongated member 105, as depicted in FIG. 6. For example, the elongated member 105 can include at least one drive pin 605 protruding from a portion of the interior surface of the elongated member 105. The drive pin 605 can protrude from the interior surface of the elongated member 105 such that at least one portion of the drive pin 605 will engage with the fire sprinkler 175 when the fire sprinkler 175 is received by the open end 110 of the elongated member 105. The drive pin 605 can vary in shape. For example, the drive pin 605 can be rounded. The drive pin 605 can be rectangular. The drive pin 605 can be triangular. The drive pin 605 can include various other shapes. The elongated member 105 can include one or more drive pins 605. For example, the elongated member 105 can include two drive pins 605. The elongated member 105 can include three drive pins 605. The device 100 can include four drive pins 605. The elongated member 105 can include more than four drive pins 605.

Figure 3:
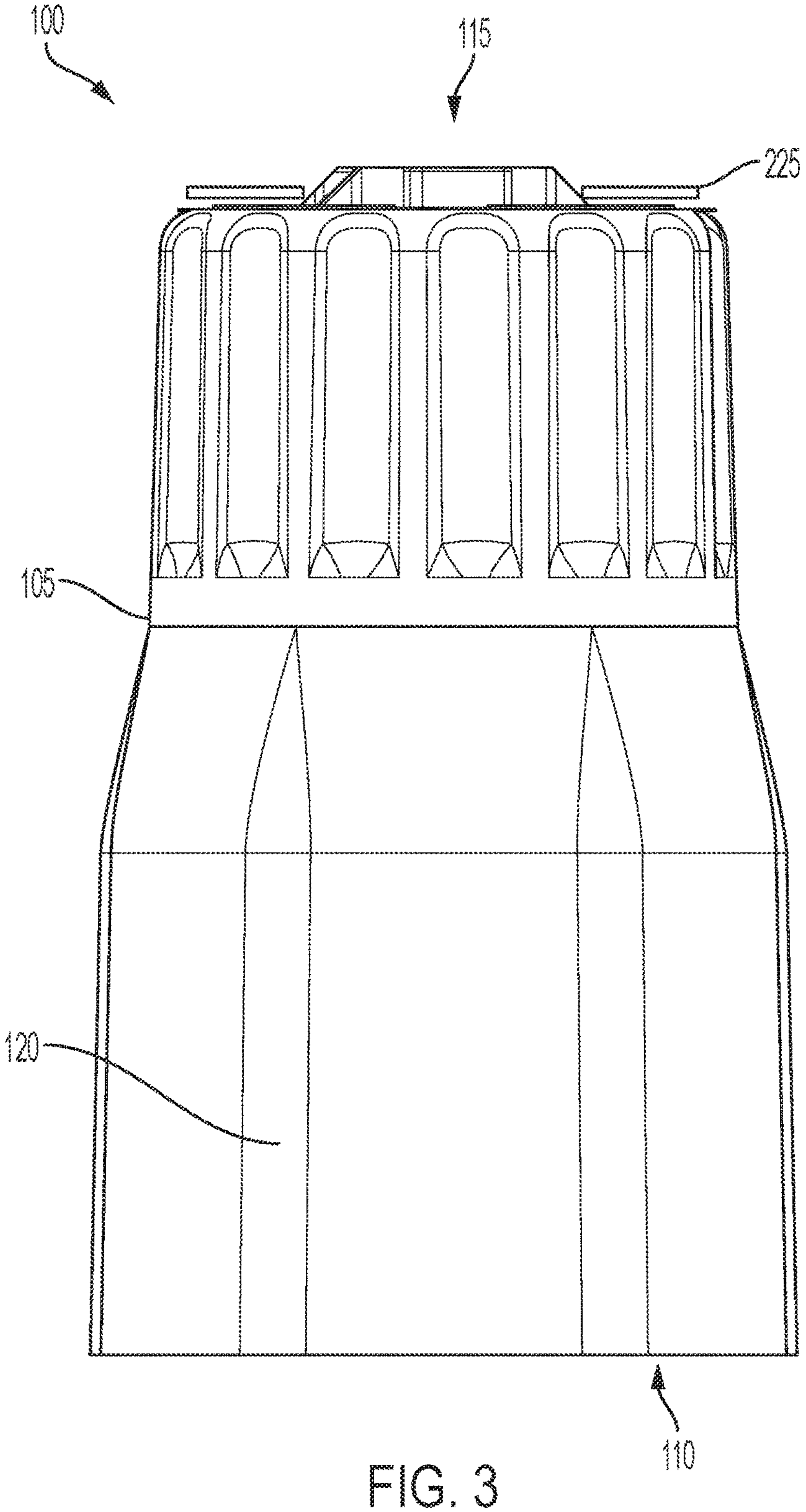
FIG. 3 is an example side view of the device of FIG. 1, according to an example implementation.

The elongated member 105 can include at least one visible element 225 extending laterally along an exterior portion of the elongated member 105. For example, the visible element 225 can extend along a portion of the closed end 115, as depicted in FIGS. 2 and 3. The visible element 225 can extend along a portion of the body 120. The visible element 225 can extend along another portion of the elongated member 105. The visible element 225 can be raised or flat against the surface of the elongated member 105. The visible element 225 can be oriented to assist in aligning the sprinkler during installation. For example, the visible element 225 can be parallel to a specific portion of the fire sprinkler 175 such that the elongated member 105 can be used to line up the fire sprinkler 175 to the fitting 160 correctly. The visible element 225 can be perpendicular to a specific portion of the fire sprinkler 175 such that the elongated member 105 can be used to line up the fire sprinkler 175 to the fitting 160 correctly, as another example. The visible element 225 can be oriented such that the elongated member 105 does not have to be removed in order to correctly install the fire sprinkler 175.

Figure 7:
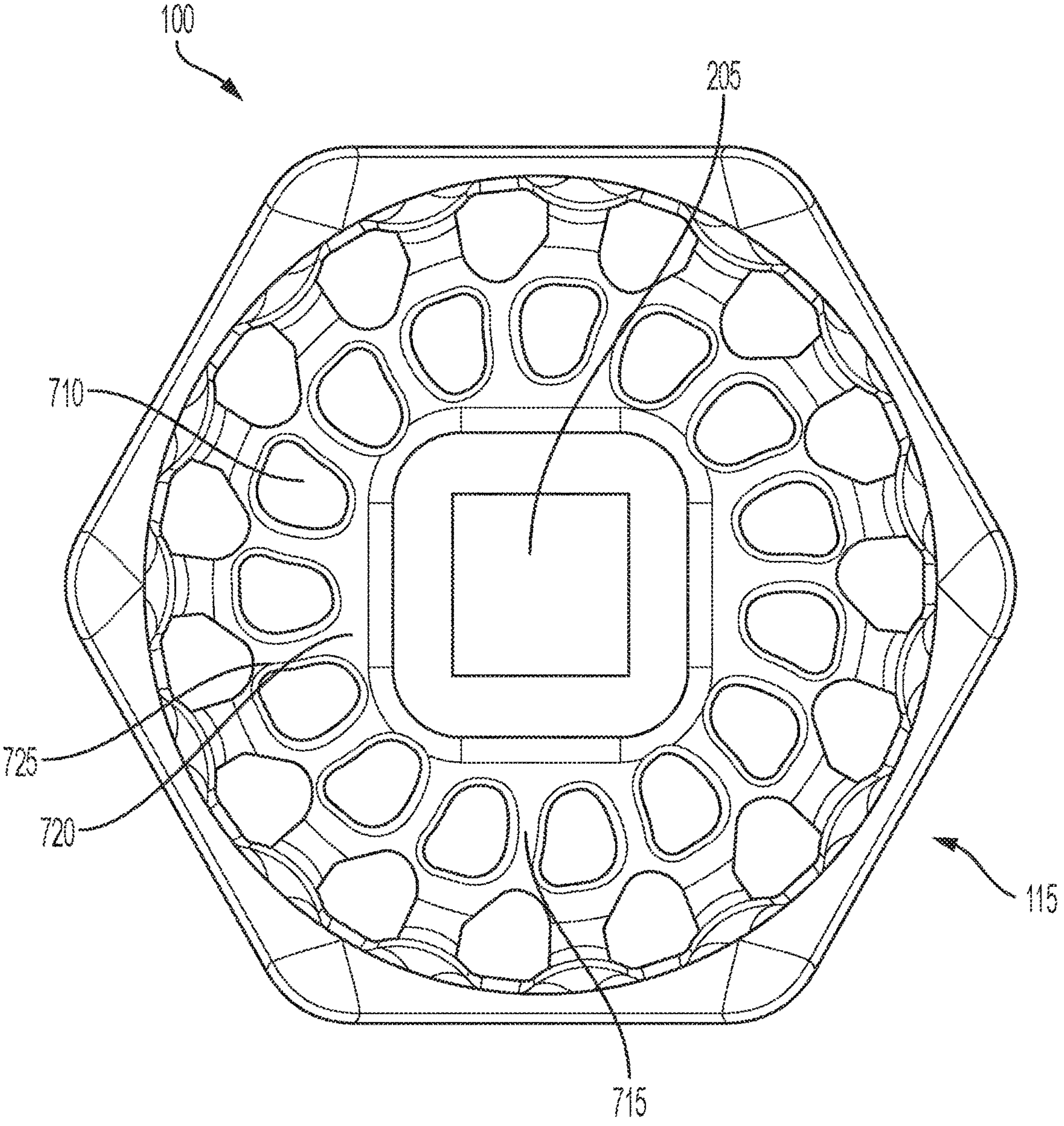
FIG. 7 is an example top view of a closed end of the device of FIG. 1, according to an example implementation.

FIG. 7 depicts the closed end 115 of the elongated member 105 according to an example implementation. The closed end 115 can include a plurality of additional apertures 710 positioned apart from a main aperture 205. The additional apertures 710 can be positioned relative to one another so as to define a spoke 715 between the additional apertures 710. For example, the spoke 715 can extend from a portion 720 of the closed end 115 surrounding the main aperture 205 to a portion 725 of the closed end 115 away from the main aperture 205. The spoke 715 can have a non-uniform geometry. For example, the spoke 715 can have non-uniform thickness. For instance, the spoke 715 can have non-uniform shape. The spoke 715 can extend continuously from the portion 720 of the closed end 115 surrounding the main aperture 205 to the portion 725 of the closed end 115 away from the main aperture 205. For example, the spoke 715 can be solid and continuous, meaning the spoke 715 can extend without any breaks or openings.

The elongated member 105 can fracture responsive to torque applied above a threshold level. For example, the spoke 715 can fracture responsive to torque above a threshold level applied in an installation direction. For instance, the spoke 715 can fracture to prevent over-torqueing during installation of the fire sprinkler 175 to prevent damage to the fire sprinkler 175. The elongated member 105 can yield when torque is applied above a threshold level during installation before the fire sprinkler 175 can be damaged, as an example. The threshold level can be defined as the level at which damage would occur to the fire sprinkler 175 if the elongated member 105 were not being used. For example, damage can include stripping any threads of the fire sprinkler 175. Damage can include breaking a portion of the fire sprinkler 175 during installation. Damage can include any means of causing the fire sprinkler 175 not to be correctly installed into the system 150.

The elongated member 105 can maintain structural integrity responsive to torque applied in a removal direction. For example, the spoke 715 can remain intact responsive to torque applied while removing the fire sprinkler 175 from the system 150. The spoke 715 can be shaped such that the spoke 715 will not fracture when torque is applied in a removal direction, as an example.

The elongated member 105 can include at least one flute 235 extending longitudinally along an exterior portion of the elongated member 105. For example, the elongated member 105 can include several flutes 235 that extend from the closed end 115 and longitudinally along an upper exterior portion of the elongated member 105, as depicted in FIG. 2. The elongated member 105 can include one or more flutes 235 that extend from the open end 110 and longitudinally along a lower portion of the elongated member 105, as another example. The elongated member 105 can include at least one flute 235 that extends longitudinally along the elongated member 105 in between the open end 110 and the closed end 115, as yet another example. While the flutes 235 depicted in FIG. 2 are all of the same shape and size, the flutes 235 can vary in size or shape along the elongated member 105. Furthermore, while the flutes 235 depicted in FIG. 2 all extend parallel with one another, the flutes 235 may extend in varying longitudinal orientations along the elongated member 105.

The elongated member 105 can include at least one drive pin 605 extending longitudinally along an interior portion of the elongated member 105, as depicted in FIG. 6. For example, the elongated member 105 can include at least one section protruding from a portion of the interior surface of the elongated member 105. The section can protrude from the interior surface of the elongated member 105 such that at least one portion of the section will engage with the fire sprinkler 175 when the fire sprinkler 175 is received by the open end 110 of the elongated member 105. The section can vary in shape. For example, the section can be rounded. The section can be rectangular. The section can be triangular. The section can be another shape. The elongated member 105 can include one or more sections. For example, the elongated member 105 can include two sections. The elongated member 105 can include three sections. The device 100 can include four sections. The elongated member 105 can include more than four sections.

The elongated member 105 can include at least one visible element 225 extending laterally along an exterior portion of the elongated member 105. For example, the visible element 225 can extend along a portion of the closed end 115, as depicted in FIGS. 2 and 3. The visible element 225 can extend along a portion of the body 120. The visible element 225 can extend along another portion of the elongated member 105. The visible element 225 can be raised or flat against the surface of the elongated member 105. The visible element 225 can be oriented to assist in aligning the sprinkler during installation. For example, the visible element 225 can be parallel to a specific portion of the fire sprinkler 175 such that the elongated member 105 can be used to line up the fire sprinkler 175 to the fitting 160 correctly. For example, the visible element 225 can be perpendicular to a specific portion of the fire sprinkler 175 such that the elongated member 105 can be used to line up the fire sprinkler 175 to the fitting 160 correctly. For example, the visible element 225 can be oriented such that the elongated member 105 does not have to be removed in order to correctly install the fire sprinkler 175. The visible element 225 can be various shapes. For example, the visible element 225 can be a straight line. The visible element 225 can be an arrow, as another example. The visible element 225 can be a circular marker, as yet another example.

Figure 8:
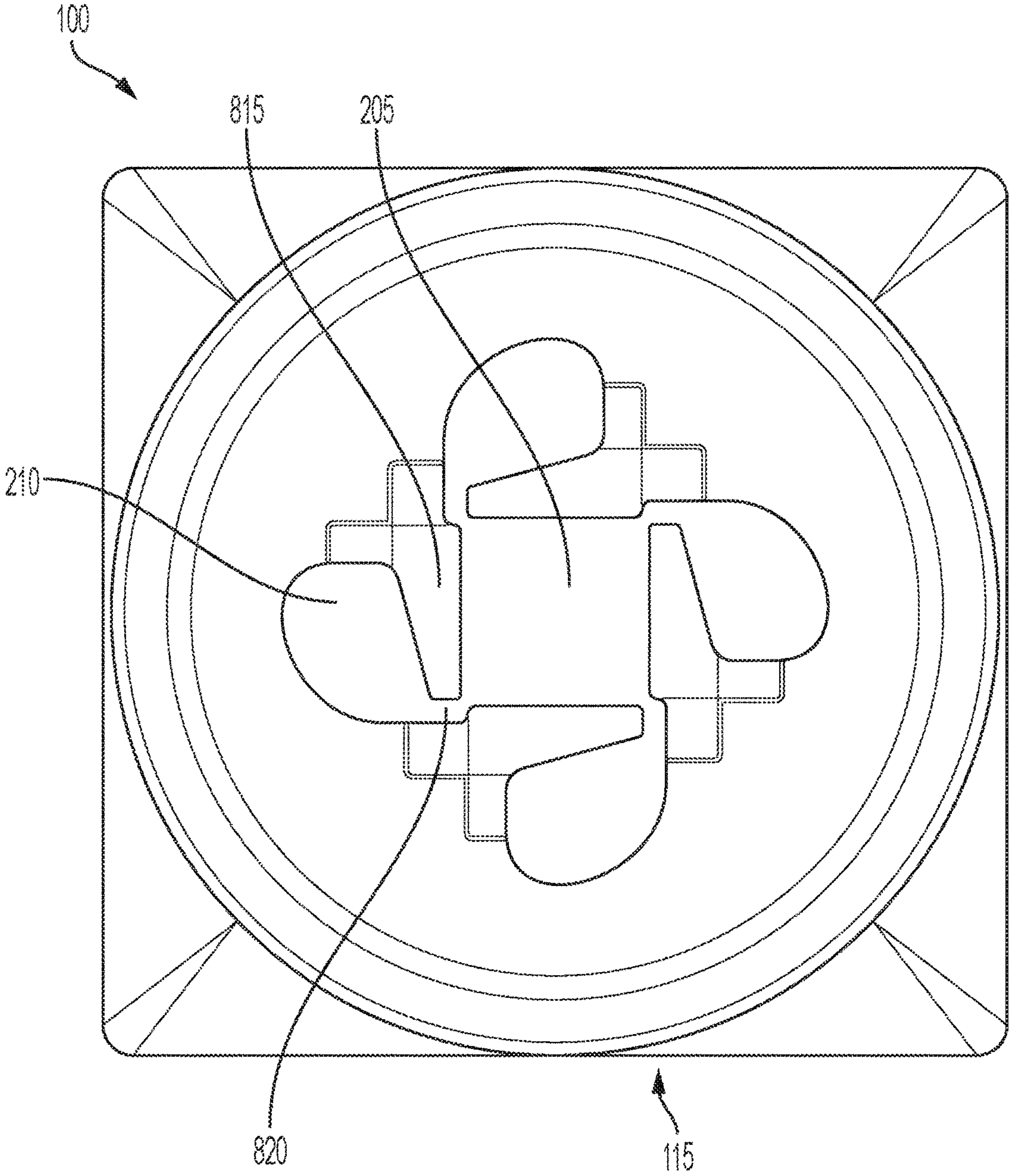
FIG. 8 is an example top view of a closed end of the device of FIG. 1, according to an example implementation.

FIG. 8 depicts the closed end 115 of the elongated member 105 according to an example implementation. The closed end 115 can include at least one portion of the surrounding aperture 210 connected to the main aperture 205 to define a channel 820 therebetween. The closed end 115 can include at least one projection 815 protruding into the channel 820. For example, the projection 815 can extend laterally from one side of the closed end 115 towards another side of the closed end 115.

The elongated member 105 can deform responsive to torque applied above a threshold level. For example, the projection 815 can deform towards the surrounding aperture 210 responsive to torque above a threshold level applied in an installation direction. For example, the projection 815 can deform to prevent over-torqueing during installation of the fire sprinkler 175 to prevent damage to the fire sprinkler 175. The projection 815 can deform such that the drive 165 of the ratcheting socket wrench 170 can clear the projection 815 and move into a different position when torque is applied above a threshold level during installation before the fire sprinkler 175 can be damaged, as an example. The threshold level can be defined as the level at which damage would occur to the fire sprinkler 175 if the elongated member 105 were not being used. For example, damage can include stripping any threads of the fire sprinkler 175. Damage can include breaking a portion of the fire sprinkler 175 during installation. Damage can include any means of causing the fire sprinkler 175 not to be correctly installed into the system 150.

The elongated member 105 can maintain structural integrity responsive to torque applied in a removal direction. For example, the projection 815 can remain intact responsive to torque applied while removing the fire sprinkler 175 from the system 150. For example, the projection 815 can be shaped such that the projection 815 will not deform when torque is applied in a removal direction.

The elongated member 105 can include at least one flute 235 extending longitudinally along an exterior portion of the elongated member 105. For example, the elongated member 105 can include a plurality of flutes 235 that extend from the closed end 115 and longitudinally along an upper exterior portion of the elongated member 105, as depicted in FIG. 2. The elongated member 105 can include one or more flutes 235 that extend from the open end 110 and longitudinally along a lower portion of the elongated member 105, as another example. The elongated member 105 can include at least one flute 235 that extends longitudinally along the elongated member 105 in between the open end 110 and the closed end 115, as yet another example. The flutes 235 can vary in size or shape along the elongated member 105. The elongated member 105 can include any number of flutes 235. For example, the elongated member 105 can include 0 flutes 235. The elongated member 105 can include one flute 235. The elongated member 105 can include 25 flutes, as another example.

The elongated member 105 can include at least one drive pin 605 extending longitudinally along an interior portion of the elongated member 105, as depicted in FIG. 6. For example, the elongated member 105 can include at least one drive pin 605, section, or part protruding from a portion of the interior surface of the elongated member 105. The drive pin 605 can protrude from the interior surface of the elongated member 105 such that at least one portion of the drive pin 605 will engage with the fire sprinkler 175 when the fire sprinkler 175 is received by the open end 110 of the elongated member 105. The drive pin 605 can vary in shape. For example, the drive pin 605 can be rounded. The drive pin 605 can be rectangular. The drive pin 605 can be triangular. The drive pin 605 can be another shape. The elongated member 105 can include one or more drive pins 605. For example, the elongated member 105 can include two drive pins 605. The elongated member 105 can include three drive pins 605. The device 100 can include four drive pins 605. The elongated member 105 can include more than four drive pins 605.

The elongated member 105 can include at least one visible element 225 extending laterally along an exterior portion of the elongated member 105. For example, the visible element 225 can extend along a portion of the closed end 115, as depicted in FIGS. 2 and 3. The visible element 225 can extend along a portion of the body 120. The visible element 225 can extend along another portion of the elongated member 105. The visible element 225 can be raised or flat against the surface of the elongated member 105. The visible element 225 can be oriented to assist in aligning the sprinkler during installation. For example, the visible element 225 can be parallel to a specific portion of the fire sprinkler 175 such that the elongated member 105 can be used to line up the fire sprinkler 175 to the fitting 160 correctly. For example, the visible element 225 can be perpendicular to a specific portion of the fire sprinkler 175 such that the elongated member 105 can be used to line up the fire sprinkler 175 to the fitting 160 correctly. For example, the visible element 225 can be oriented such that the elongated member 105 does not have to be removed in order to correctly install the fire sprinkler 175. The visible element 225 can be various shapes and sizes. For example, the visible element 225 can be a straight line that extends laterally along the entire elongated member 105. The visible element 225 can be arcuate line that extends longitudinally along a portion of the elongated member, as another example. The visible element 225 can be an arrow, as another example. The visible element 225 can be a circular marker, as yet another example.

Figure 9:
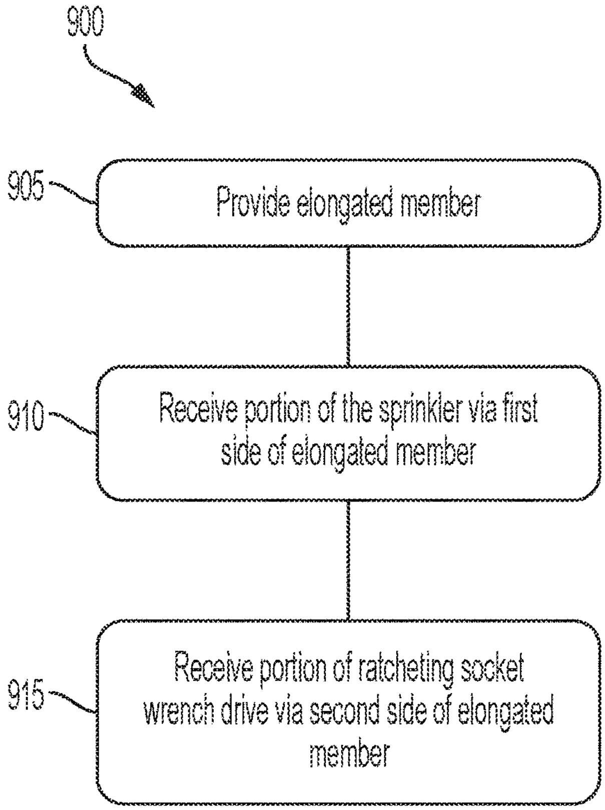
FIG. 9 is an example illustration of a process of configuring a fire sprinkler, according to an example implementation.

FIG. 9 depicts a method 900 for configuring a fire sprinkler. Configuring a fire sprinkler can include installing the fire sprinkler into a piping system. Configuring a fire sprinkler can include removing the fire sprinkler from a piping system. The method 900 can include providing an elongated member, as depicted in act 905. The elongated member can include an open end and a closed end. The closed end can include several openings. For example, the closed end can include one opening. The closed end can include five openings. The closed end can include ten openings. The closed end can include greater than ten openings. The elongated member can include a body extending between the open end and the closed end. For example, the body can be tubular in shape. The body can be rectangular in shape. The body can extend between an open end and a closed end in various shapes.

The method 900 can include receiving a portion of the fire sprinkler, as depicted in act 910. For example, the portion of the fire sprinkler can be received via a first side of the elongated member. The first side of the elongated member can be an open end. For example, the open end can be hexagonal in shape. The open end can be rectangular in shape. The open end can be round in shape. The open end can be any shape to receive a portion of the fire sprinkler.

The method 900 can include receiving a portion of a ratcheting socket wrench drive, as depicted in act 915. For example, the ratcheting socket wrench drive can be received via a second side of the elongated member. The second end of the elongated member can be a closed end with openings. For example, the closed end can include one opening. The closed end can include five openings. The closed end can include ten openings. The closed end can include greater than ten openings. The closed end can include a main aperture for receiving the portion of the ratcheting socket wrench.

The closed end of the elongated member can include at least one surrounding aperture. For example, the closed end can include two surrounding apertures. The closed end can include four surrounding apertures. The closed end can include more than four surrounding apertures. The surrounding aperture can be spaced apart from the main aperture. For example, the surrounding aperture can be spaced apart from the main aperture so as to define a solid partition therebetween. For example, the solid partition can be a continuous barrier between the main aperture and the surrounding aperture, meaning the partition can extend between the main aperture and the surrounding aperture continuously such that it has no breaks or openings. The solid partition can have a non-uniform thickness. For example, the solid partition can have a thicker portion and a thinner portion. The solid partition can decrease in thickness from one portion of the solid partition to another portion of the solid partition. The solid partition can increase in thickness from one portion of the solid partition to another portion of the solid partition.

Figure 10:
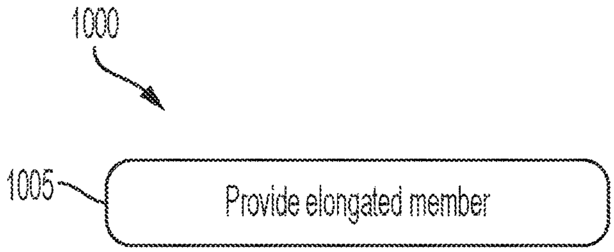
FIG. 10 is an example illustration of a process of configuring a fire sprinkler, according to an example implementation.

FIG. 10 depicts a method 1000 of configuring a fire sprinkler. Configuring a fire sprinkler can include installing the fire sprinkler into a piping system. Configuring a fire sprinkler can include removing the fire sprinkler from a piping system. The method 1000 can include providing an elongated member, as depicted in act 1005. The elongated member can include an open end and a closed end. The closed end can include several openings. The elongated member can include a body extending between the open end and the closed end. The open end can receive a portion of the fire sprinkler. The closed end can include a main aperture to receive a portion of a ratcheting socket wrench drive. The closed end can also include at least one surrounding aperture positioned apart from the main aperture to define a solid partition therebetween. The solid partition can have a non-uniform thickness.

The terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

The term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the device as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A device to configure a fire sprinkler, the device comprising:

an elongated member, the elongated member having an open end, an opposing closed end, and a body extending longitudinally therebetween;

the open end to receive a portion of the fire sprinkler;

the closed end having a main aperture to receive a portion of a ratcheting socket wrench drive and at least one surrounding aperture positioned apart from the main aperture so as to define a solid partition forming a continuous barrier therebetween;

the solid partition extending between a first end and a second end, the first end defining a thinnest point and the second end defining a thickest point such that the solid partition includes a non-uniform thickness between the main aperture and the at least one surrounding aperture; and the at least one surrounding aperture having a fillet edge disposed at the thinnest point of the solid partition and having a rounded edge disposed at the thickest point.

2. The device of claim 1, comprising:

the solid partition to fracture responsive to torque above a threshold level applied in an installation direction.

3. The device of claim 1, comprising:

the solid partition to maintain structural integrity with torque applied in a removal direction.

4. The device of claim 1, comprising:

the solid partition configured to fracture at the thinnest point of the solid partition.

5. The device of claim 1, comprising:

the main aperture includes at least one of a square shape, a rectangular shape, or a triangular shape to receive the portion of the ratcheting socket wrench drive.

6. The device of claim 1, comprising:

at least one flute that extends longitudinally along an exterior portion of the elongated member.

7. The device of claim 1, comprising:

at least one drive pin that extends longitudinally along an interior portion of the elongated member, the drive pin to engage with the portion of the fire sprinkler.

8. The device of claim 1, comprising:

at least one visible element that extends laterally along an exterior portion of the elongated member, the element oriented to assist in aligning the fire sprinkler with installment.

9. The device of claim 1, comprising:

the fillet edge having a radius of 0.01 inches.

10. A device to configure a fire sprinkler, the device comprising:

an elongated member, the elongated member having an open end, an opposing closed end, and a body extending longitudinally therebetween;

the open end to receive a portion of the fire sprinkler;

the closed end having a main aperture to receive a portion of a ratcheting socket wrench drive and at least two additional apertures to define a spoke that extends from a portion of the closed end surrounding the main aperture to a portion of the closed end away from the main aperture; and the spoke having a non-uniform geometry defined by a first curved end extending along a first of the at least two additional apertures and a second curved end extending along a second of the at least two additional apertures, the first curved end and the second curved end curving in the same direction relative to the main aperture.

11. The device of claim 10, comprising:

the spoke to fracture responsive to torque above a threshold level applied in an installation direction.

12. The device of claim 10, comprising:

the spoke to maintain structural integrity with torque applied in a removal direction.

13. The device of claim 10, comprising:

at least one flute that extends longitudinally along an exterior portion of the elongated member.

14. The device of claim 10, comprising:

at least one drive pin that extends longitudinally along an interior portion of the elongated member, the drive pin to engage with the portion of the fire sprinkler.

15. The device of claim 10, comprising:

at least one visible element that extends laterally along an exterior portion of the elongated member, the element oriented to assist in aligning the fire sprinkler with installment.

16. A device to configure a fire sprinkler, the device comprising:

an elongated member, the elongated member having an open end, an opposing closed end, and a body extending longitudinally therebetween;

the open end to receive a portion of the fire sprinkler;

the closed end having a main aperture to receive a portion of a ratcheting socket wrench drive and at least one additional aperture;

the at least one additional aperture having at least one section connected to the main aperture to define a channel therebetween; and at least one portion of the closed end to protrude into the channel to define a projection, the projection extending between the main aperture and the at least one additional aperture and defining a first end disposed at the channel and a second end disposed away from the channel, wherein a thickness of the first end is greater than a thickness of the second end.

17. The device of claim 16, comprising:

the projection to deform responsive to torque above a threshold level applied in an installation direction.

18. The device of claim 16, comprising:

the projection to maintain structural integrity with torque applied in a removal direction.

19. The device of claim 16, comprising:

at least one flute that extends longitudinally along an exterior portion of the elongated member.

20. The device of claim 16, comprising:

at least one drive pin that extends longitudinally along an interior portion of the elongated member, the drive pin to engage with the portion of the fire sprinkler.

* * * * *